United States Patent
Chen

(10) Patent No.: US 11,614,885 B2
(45) Date of Patent: Mar. 28, 2023

(54) DATA PROCESSING METHOD FOR IMPROVING ACCESS PERFORMANCE OF MEMORY DEVICE AND DATA STORAGE DEVICE UTILIZING THE SAME

(71) Applicant: Silicon Motion, Inc., Hsinchu County (TW)

(72) Inventor: Yu-Ta Chen, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/242,332

(22) Filed: Apr. 28, 2021

(65) Prior Publication Data

US 2021/0397370 A1 Dec. 23, 2021

Related U.S. Application Data

(60) Provisional application No. 63/042,539, filed on Jun. 22, 2020.

(30) Foreign Application Priority Data

Nov. 11, 2020 (TW) ................................ 109139250

(51) Int. Cl.
*G06F 3/06* (2006.01)
(52) U.S. Cl.
CPC .......... *G06F 3/0656* (2013.01); *G06F 3/0613* (2013.01); *G06F 3/0638* (2013.01); *G06F 3/0679* (2013.01)
(58) Field of Classification Search
CPC ...... G05B 13/00–048; G05B 15/00–02; G05B 17/00–02; G06F 1/00–3296;

(Continued)

(56) References Cited

U.S. PATENT DOCUMENTS 9,323,657 B1 * 4/2016 Sela ..................... G06F 11/0793
10,198,207 B2 * 2/2019 Lee ........................ G06F 12/00

(Continued)

FOREIGN PATENT DOCUMENTS

CN      101644995 B     12/2011
WO   2019/222381 A1    11/2019

OTHER PUBLICATIONS

Wookhan Jeong et al; Improving flash storage performance by caching address mapping table in host memory; In Proceedings of USENIX HotStorage '17 (2017); retrieved from https://www.usenix.org/system/files/conference/hotstorage17/hotstorage17-paper-jeong.pdf on Jun. 7, 2022 (Year: 2017).*

(Continued)

*Primary Examiner* — Daniel C. Chappell
(74) *Attorney, Agent, or Firm* — Winston Hsu

(57) ABSTRACT

A data storage device includes a memory device and a memory controller. The memory controller is configured to configure a predetermined memory block as an active memory block to receive data from a host device and accordingly record a plurality of logical addresses in a first mapping table. In response to a determination of recommending for activating one or more sub-regions of the memory device or delivering one or more Host Performance Booster (HPB) entries is required, the memory controller is further configured to update a second mapping table based on the first mapping table before delivering the HPB entries to the host device. The memory controller is further configured to generate the HPB entries according to the second mapping table after the second mapping table has been updated based on the first mapping table and deliver a packet comprising the HPB entries to the host device.

12 Claims, 7 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 10,339,046 | B1 * | 7/2019 | Hsieh | G06F 3/0659 |
| 10,430,117 | B2 * | 10/2019 | Jean | G06F 3/0622 |
| 10,466,905 | B2 * | 11/2019 | Lee | G06F 3/064 |
| 10,489,290 | B2 * | 11/2019 | Kim | G06F 3/0659 |
| 10,606,761 | B2 * | 3/2020 | Lee | G06F 12/1009 |
| 10,698,809 | B2 * | 6/2020 | Lee | G06F 12/1009 |
| 11,137,914 | B2 * | 10/2021 | Sela | G06F 13/1642 |
| 11,403,167 | B2 * | 8/2022 | Lee | G06F 11/1004 |
| 11,449,417 | B2 * | 9/2022 | Kim | G06F 3/061 |
| 11,487,660 | B2 * | 11/2022 | Seok | G06F 3/061 |
| 2014/0281361 | A1 | 9/2014 | Park | |
| 2018/0024745 | A1 * | 1/2018 | Lee | G06F 11/1068 711/103 |
| 2022/0113877 | A1 * | 4/2022 | Kim | G06F 3/0679 |

OTHER PUBLICATIONS

T. Huai-liang, T. Wei-xin and S. Jian-hua, "An I/O Acceleration Technology for Network Computing: iTRM," 2008 International Conference on Computer Science and Software Engineering, Wuhan, China, 2008, pp. 275-278, doi: 10.1109/CSSE.2008.915. (Year: 2008).*

R. Ge, X. Feng, M. Burtscher and Z. Zong, "Performance and Energy Modeling for Cooperative Hybrid Computing," 2014 9th IEEE International Conference on Networking, Architecture, and Storage, Tianjin, China, 2014, pp. 232-241, doi: 10.1109/NAS.2014. 42. (Year: 2014).*

C. . -H. Chu, K. Hamidouche, H. Subramoni, A. Venkatesh, B. Elton and D. K. Panda, "Designing High Performance Heterogeneous Broadcast for Streaming Applications on GPU Clusters," 2016 28th International Symposium on Computer Architecture and High Performance Computing, doi: 10.1109/SBAC-PAD.2016.16. (Year: 2016).*

* cited by examiner

| Content from Table 2(4 Bytes) | Content from Table 1(4 Bytes) |
|---|---|

FIG. 5

DATA PROCESSING METHOD FOR IMPROVING ACCESS PERFORMANCE OF MEMORY DEVICE AND DATA STORAGE DEVICE UTILIZING THE SAME

CROSS REFERENCE TO RELATED APPLICATIONS

This application claims the benefit of U.S. Provisional Application No. 63/042,539 filed 2020 Jun. 22, the entirety of which is incorporated by reference herein.

BACKGROUND OF THE INVENTION

1. Field of the Invention

The invention relates to a data processing method for effectively improving access performance of a memory device and the associated data storage device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, effective control of access to these data storage devices is an important issue.

In order to assist access operations of the data storage device, one or more mapping tables configured to record mapping relationships between physical addresses and logical addresses are established and maintained by the data storage device. The logical addresses are the addresses mainly utilized by a host device coupled to the data storage device. The host device uses the logical addresses to identify different memory spaces. The physical addresses are the addresses mainly utilized by the data storage device. The data storage device uses the physical addresses to identify different memory spaces. The memory controller manages the mapping tables based on the access operations of the data storage device.

In response to a read command carrying a logical address that the host device attempts to read, the memory controller has to look up the mapping table to retrieve the physical address which actually stores the data of the logical address to be read. However, to lookup or search in the table is a time consuming operation. In addition, the table size usually increases as the memory size of the memory device increases. Therefore, the time required for looking up or searching in the mapping table increases enormously when the size of the mapping table grows.

To solve this problem and to improve the read speed of the memory device, a data processing method for effectively processing data stored in the memory device and improving the access performance of the memory device is highly required.

SUMMARY OF THE INVENTION

It is an objective of the invention to solve the problem discussed above and to improve the read speed of the memory device.

According to an embodiment of the invention, a data storage device comprises a memory device and a memory controller. The memory device comprises a plurality of memory blocks. The memory controller is coupled to the memory device and configured to access the memory device. The memory controller is configured to configure a predetermined memory block as an active memory block to receive data from a host device and accordingly record a plurality of logical addresses in a first mapping table. The first mapping table comprises a plurality of fields, one field of the first mapping table is configured to record mapping information of one physical address of the active memory block, and the mapping information of the physical address is physical-to-logical mapping information regarding which logical address the data stored in the physical address of the active memory block is directed to. In response to a determination of recommending for activating one or more sub-regions of the memory device or delivering one or more Host Performance Booster (HPB) entries is required, the memory controller is further configured to update a second mapping table based on the first mapping table before delivering the one or more HPB entries to the host device. The second mapping table comprises a plurality of fields, one field of the second mapping table is configured to record mapping information of one logical address, and the mapping information of the logical address is logical-to-physical mapping information regarding which physical address of the memory device stores data of the logical address. The memory controller is further configured to generate the one or more HPB entries according to the second mapping table after the second mapping table has been updated based on the first mapping table and deliver a packet comprising the one or more HPB entries to the host device.

According to an embodiment of the invention, a data processing method for a data storage device is proposed. The data storage device comprises a memory device and a memory controller, the memory device comprises a plurality of memory blocks, and the memory controller is coupled to the memory device and configured to access the memory device. The data processing method is performed by the memory controller and comprises: configuring a predetermined memory block as an active memory block to receive data from a host device and accordingly recording a plurality of logical addresses in a first mapping table, wherein the first mapping table comprises a plurality of fields, one field of the first mapping table is configured to record mapping information of one physical address of the active memory block, and the mapping information of the physical address is physical-to-logical mapping information regarding which logical address the data stored in the physical address of the active memory block is directed to; in response to a determination of recommending for activating one or more sub-regions of the memory device or delivering one or more Host Performance Booster (HPB) entries is required, updating a second mapping table based on the first mapping table before delivering the one or more HPB entries to the host device, wherein the second mapping table comprises a plurality of fields, one field of the second mapping table is configured to record mapping information of one logical address, and the mapping information of the logical address is logical-to-physical mapping information regarding which physical address of the memory device stores data of the logical address; generating the one or more HPB entries according to the second mapping table after the second mapping table has been updated based on the first mapping table; and delivering a packet comprising the one or more HPB entries to the host device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a schematic diagram showing an exemplary format for an HPB entry.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
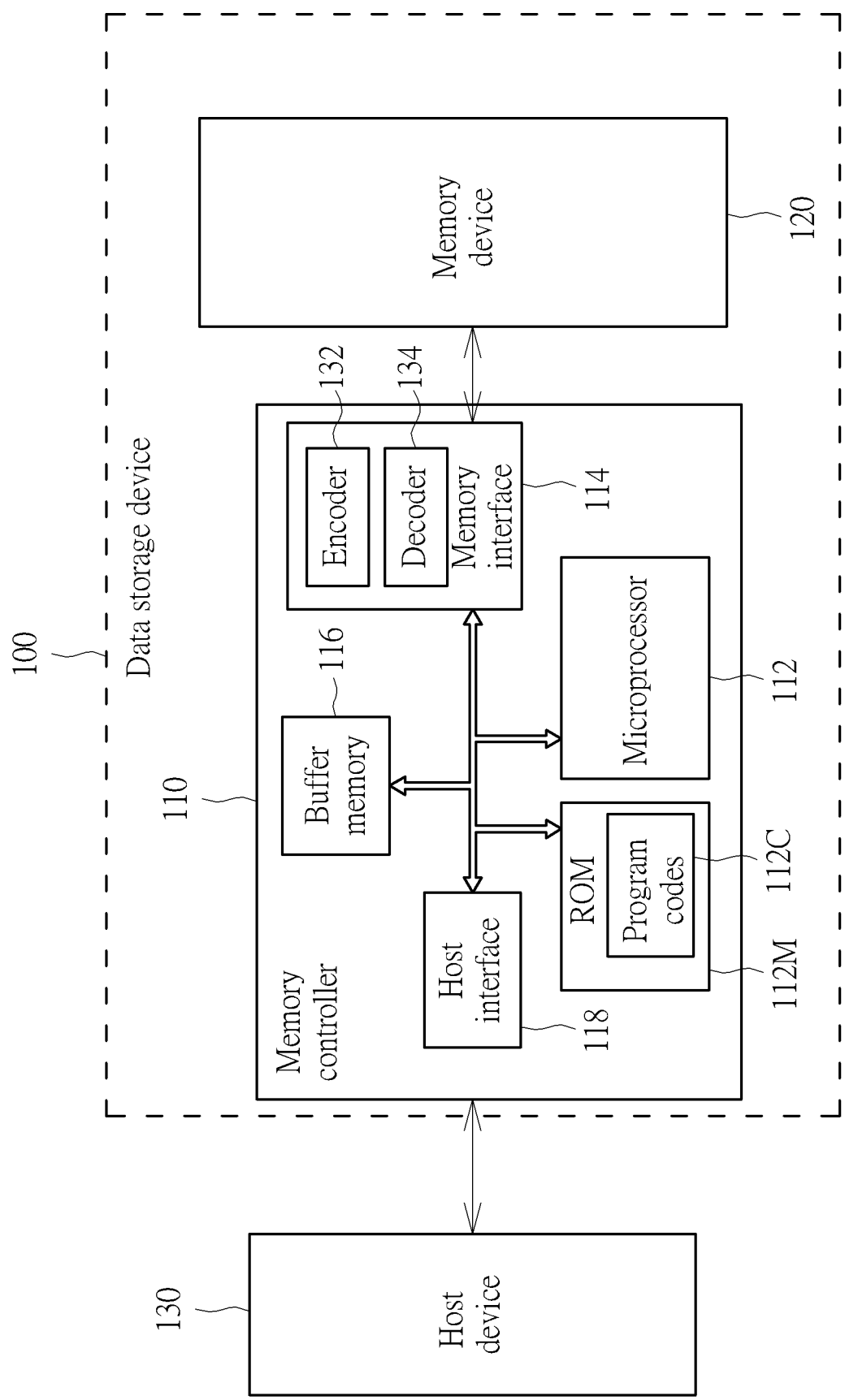
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g. a Flash memory) device and may comprise one or more memory elements (e.g. one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g. read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

The memory device 120 may store a global Logical-to-Physical (L2P) (or called Host-to-Flash (H2F)) mapping table, for the memory controller 110 to access data in the memory device 120. The global L2P mapping table may be located in a predetermined region within the memory device 120, such as a system region, but the invention is not limited thereto. The global L2P mapping table may be divided into a plurality of local L2P mapping tables, and the local L2P mapping tables may be stored in the same or different memory elements. For example, one memory element may store one local L2P mapping table. When needed, the memory controller 110 may load at least one portion (e.g. a portion or all) of the global L2P mapping table into the buffer memory 116 or other memories. For example, the memory controller 110 may load a local L2P mapping table to be a temporary L2P mapping table, for the memory controller 110 to access data in the memory device 120 according to local L2P mapping table, but the invention is not limited thereto.

In order to improve the read performance, the HPB (Host Performance Booster) series standards have been recently promulgated. The HPB uses a memory at the host device side (such as the DRAM of the host device 130) to temporarily store the mapping information maintained by the UFS device (such as the data storage device 100 implemented in compliance with the UFS standards). The mapping information may be retrieved from the global or local L2P mapping table. With the aid of the mapping information, the host device 130 may issue specific read commands (hereinafter called the HPB READ commands) carrying information regarding physical addresses (such as the physical block addresses (PBAs)), which are carried in the HPB entries, corresponding to logical addresses (such as the logical block addresses (LBAs)) that the host device 130 attempts to read to read data. In this manner, as compared to the normal read command, the memory controller 110 could save the time to read and load the global or local L2P mapping table from the memory device 120 and save the time to search the physical addresses corresponding to the logical addresses that the host device 130 attempts to read in the loaded L2P mapping table. Therefore, the read performance can be improved.

Figure 2:
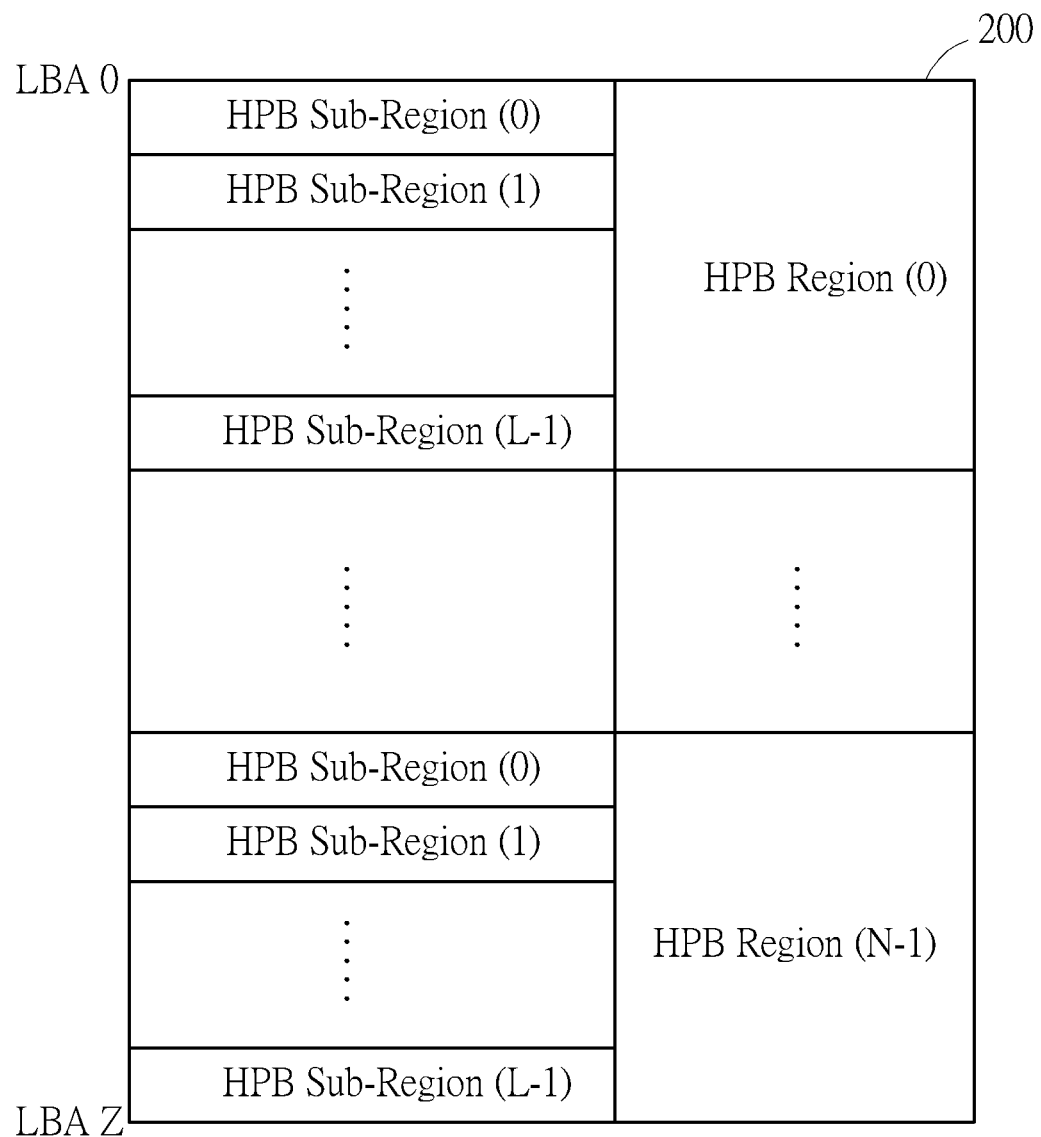
FIG. 2 is a schematic diagram showing an exemplary logical unit and its corresponding LBAs.

Generally, the memory device 120 may be divided into several partitions, each partition may be regarded as a logical unit, and each logical unit may correspond to a plurality of LBAs. FIG. 2 is a schematic diagram showing an exemplary logical unit 200 and its corresponding LBAs. As defined in the HPB specification, the LBAs (such as the LBAs LBA 0-LBA Z, where Z is a positive integer) corresponding to each logical unit may be divided into a plurality of HPB Regions (such as the HPB Region (0)-HPB Region (N−1), where N is a positive integer and greater than 1), and each HPB Region may be further divided into a plurality of HPB Sub-Regions (such as the HPB Sub-Region (0)-HPB Sub-Region (L−1), where L is a positive integer). The size of one HPB Sub-Region (hereinafter called a Sub-Region for brevity) may be smaller than or equal to the size of one HPB Region (hereinafter called a Region for brevity).

In the embodiments of the invention, there are two modes for obtaining the HPB entries, including the Host control mode and the Device control mode.

Figure 3:
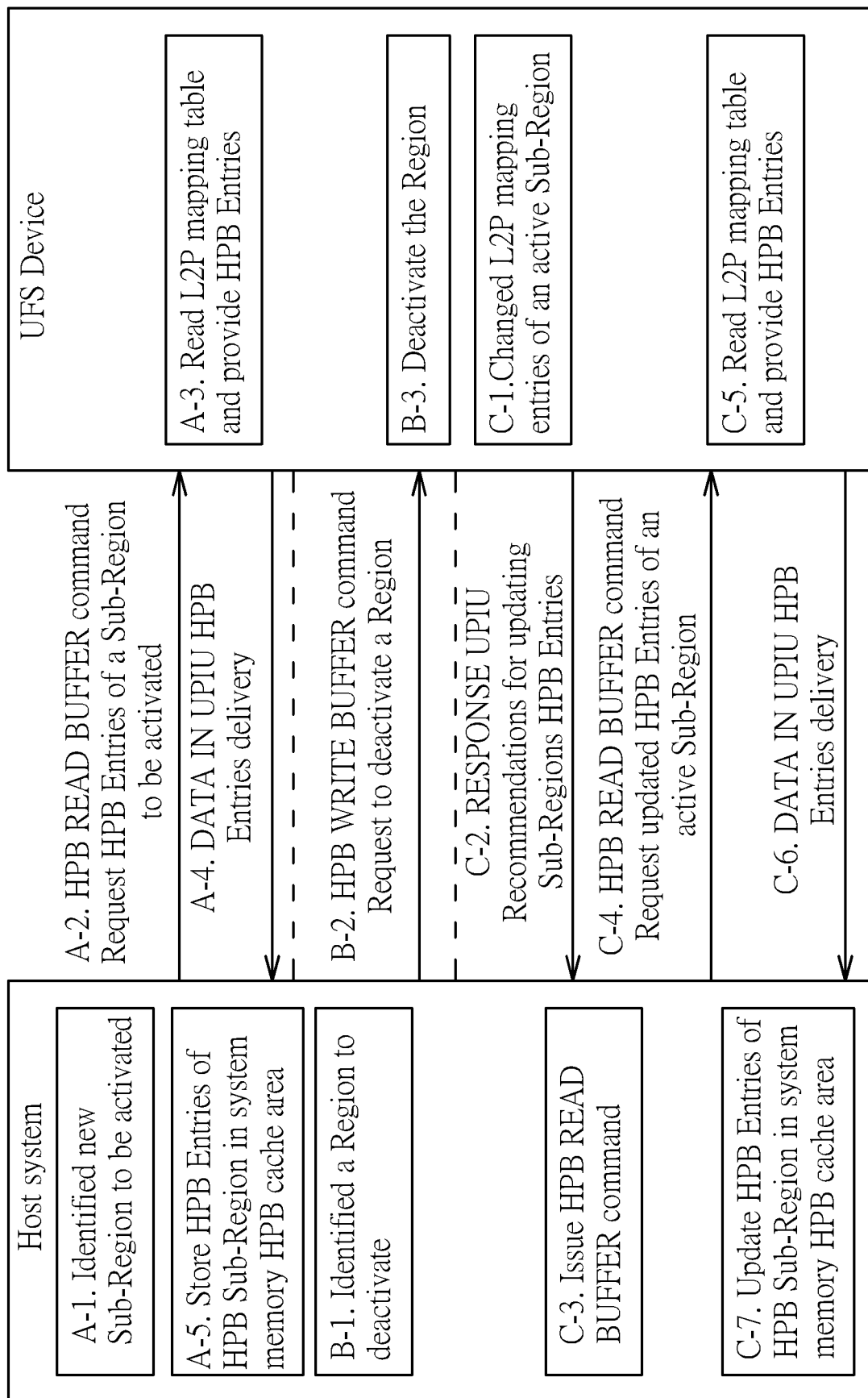
FIG. 3 is a schematic diagram showing operations under the Host control mode.

FIG. 3 is a schematic diagram showing operations under the Host control mode. In the Host control mode, the host system (such as the host device 130) may identify the new Sub-Region to be activated (e.g. the operation A-1) and issue an HPB READ BUFFER command to request the HPB entries of the Sub-Region to be activated (e.g. the operation A-2). In response to reception of the HPB READ BUFFER command, the UFS device (such as the memory controller 110) may read at least a portion of the L2P mapping table (such as the global L2P mapping table or the local L2P mapping table) corresponding to the designated Sub-Region to be activated from the memory device 120 and provide the HPB entries based on the mapping information recorded in the L2P mapping table (e.g. the operation A-3). The UFS device may then deliver the HPB entries via a DATA IN UFS Protocol Information Unit (UPIU) packet to the host system (e.g. the operation A-4). The host system may allocate an HPB area (also referred to as an HPB cache area) in a system memory for storing the HPB entries (e.g. the operation A-5).

The host system may also identify the Region to deactivate (e.g. the operation B-1) and issue an HPB WRITE BUFFER command to request to deactivate a Region (e.g. the operation B-2). In response to reception of the HPB WRITE BUFFER command, the UFS device may deactivate the Region (e.g. the operation B-3).

In addition, when the UFS device determines that update of the HPB entries of any Sub-Region is required, for example, when the UFS device has changed the L2P mapping information (e.g. L2P mapping entries) of an active Sub-Region (e.g. the operation C-1), the UFS device may transmit a RESPONSE UPIU packet to the host system for recommendation for updating Sub-Regions HPB entries (e.g. the operation C-2). The host system may issue an HPB READ BUFFER command in response to reception of the RESPONSE UPIU packet (e.g. the operation C-3) and transmit the HPB READ BUFFER command to the UFS device to request updated HPB entries of an active Sub-Region (e.g. the operation C-4). In response to reception of the HPB READ BUFFER command, the UFS device may read the portion of the L2P mapping table associated with the active Sub-Region and provide the HPB entries based on the mapping information recorded in the L2P mapping table (e.g. the operation C-5). Similarly, the UFS device may deliver the HPB entries via a DATA IN UPIU packet to the host system (e.g. the operation C-6). The host system may update the HPB entries of the HPB Sub-Region stored in the system memory HPB cache area based on the received information (e.g. the operation C-7).

Figure 4:
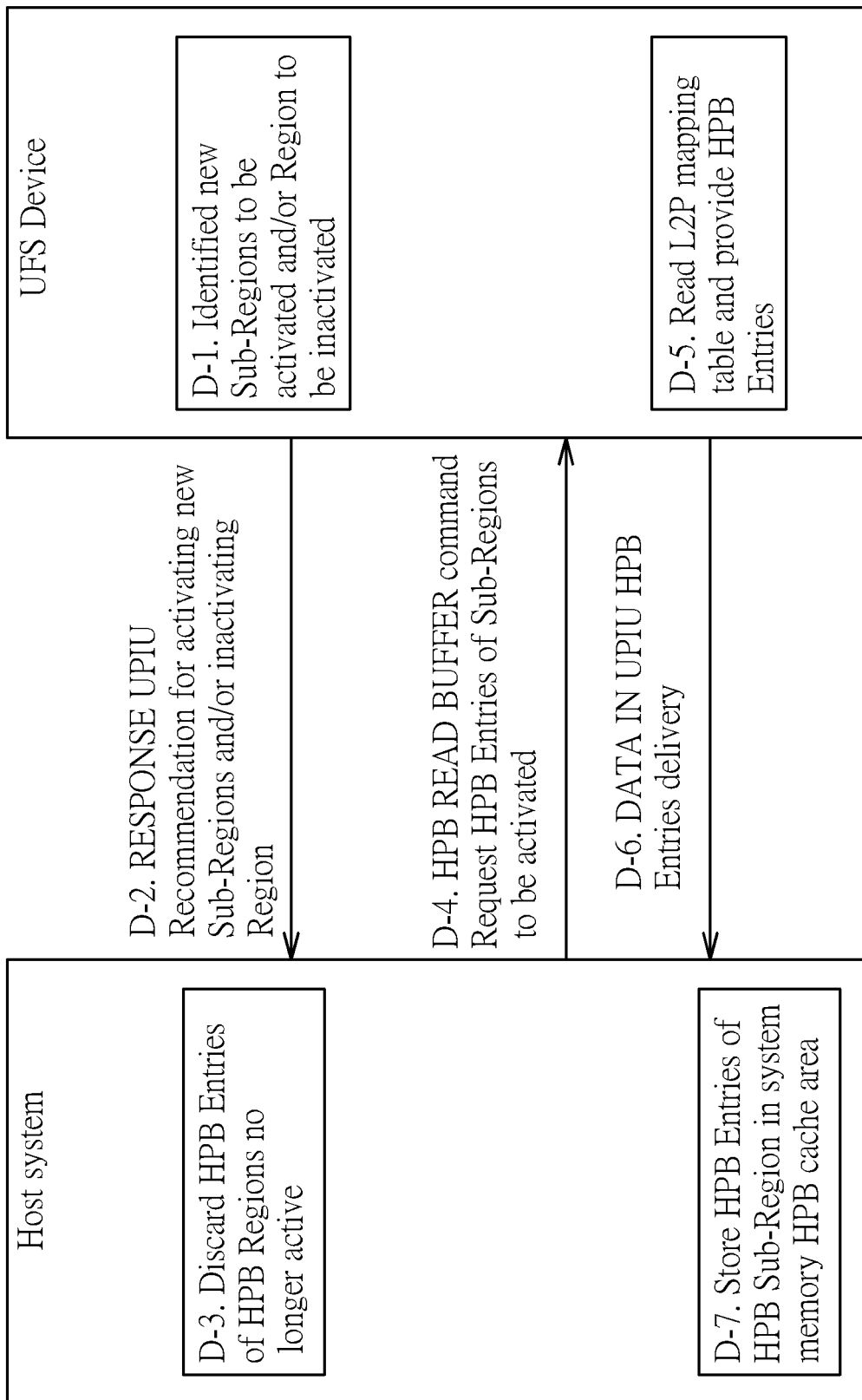
FIG. 4 is a schematic diagram showing operations under the Device control mode.

FIG. 4 is a schematic diagram showing operations under the Device control mode. In the Device control mode, the UFS device may identify the new Sub-Regions to be activated and/or a Region to be inactivated (e.g. the operation D-1) and transmit a RESPONSE UPIU packet to the host system for recommendation for activating the new Sub-Regions and/or inactivating the Region (e.g. the operation D-2). Regarding inactivating the Region, in response to reception of the RESPONSE UPIU packet, the host system may discard the HPB entries of the HPB Regions no longer active (e.g. the operation D-3). Regarding activating the new Sub-Regions, the host system may issue an HPB READ BUFFER command to the UFS device to request the HPB entries of the new Sub-Regions to be activated (e.g. the operation D-4). Similarly, in response to reception of the HPB READ BUFFER command, the UFS device may read at least a portion of the L2P mapping table (such as read the global L2P mapping table or the local L2P mapping table) corresponding to the designated Sub-Region to be activated from the memory device 120 and provide the HPB entries based on the mapping information recorded in the L2P mapping table (e.g. the operation D-5). The UFS device may then deliver the HPB entries via a DATA IN UPIU packet to the host system (e.g. the operation D-6). The host system may allocate an HPB area (also referred to as an HPB cache area) in a system memory for storing the HPB entries (e.g. the operation D-7).

FIG. 5 is a schematic diagram showing an exemplary format for an HPB entry. In an exemplary embodiment, the size of one HPB entry is 8 Bytes. In this exemplary format, four bytes may be utilized to carry the mapping information (for example, the physical address) obtained from the L2P mapping table (such as the global or local L2P mapping table, or a temporary L2P mapping table loaded by the memory controller 110 in the buffer memory 116), and the other four bytes may be utilized to carry another physical address indicating where the aforementioned global or local L2P mapping table is physically stored in the flash memory. To be more specific, in the exemplary format shown in FIG. 5, the first 4 bytes PBA and the second 4 bytes PBA are combined to form an HPB entry. The first PBA is a PBA recorded in the Table 1 (also referred to as the T1 table), and this PBA is mapped by an LBA. The second PBA is a PBA recorded in the Table 2 (also referred to as the T2 table), and this PBA is the PBA of the T1 table. Here, the T1 table may be the global or local L2P mapping table stored in the memory device 120, and the T2 table may be a system table recording the corresponding addresses at which the management tables (for example, the global or local L2P mapping tables) are physically stored in the memory device 120.

Because the memory controller 110 may allocate another memory space to store a management table (such as the global or local L2P mapping table) when the content (such as the mapping information) of this management table has to be updated, when the PBA mapped by an LBA is changed, not only the content of the T1 table is modified but also the updated T1 table is stored in a new space of the memory device 120. Therefore, the corresponding physical address of the T1 table recorded in the system table may change as well. In this manner, the content of the T2 table carried in an HPB entry (e.g. the "Content from Table 2" as shown in FIG. 5) may be utilized to verify if the data stored in a PBA mapped by an LBA corresponding to (or, associated with) this HPB entry is still valid. When the content of the T2 table carried in the HPB entry is the same as the corresponding physical address of the latest T1 table maintained by the memory controller 110, the data stored in this PBA, that is, the content of the T1 table carried in the HPB entry, (e.g. the "Content from Table 1" as shown in FIG. 5) is regarded as valid. Otherwise, the data stored in this PBA carried in the HPB entry is regarded as invalid. Noted that verification of whether the data of a PBA is still valid may be performed by the memory controller 110 at the data storage device side.

Figure 6:
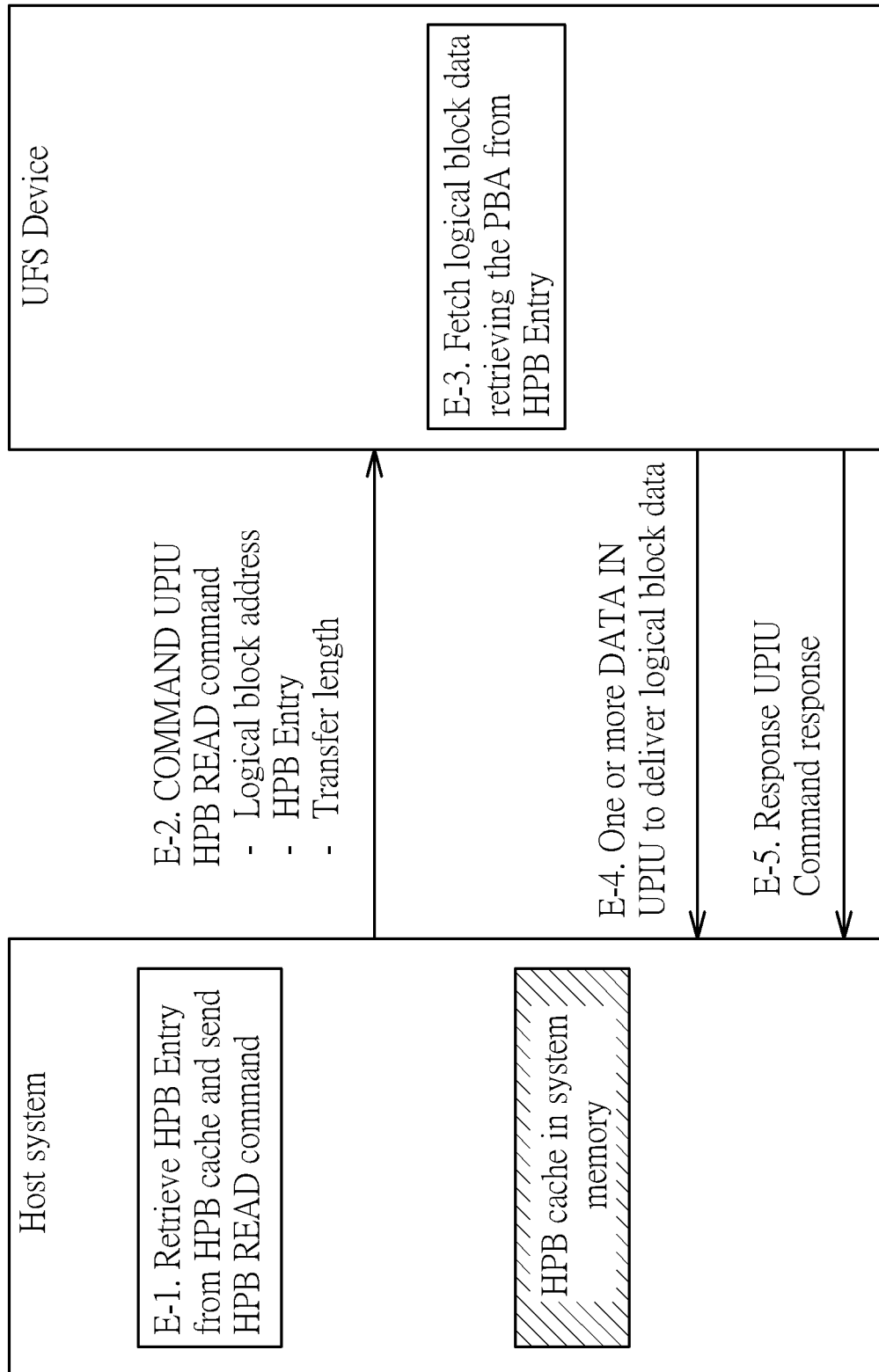
FIG. 6 is a schematic diagram showing operations corresponding to the HPB READ command.

With the aid of the HPB entries, the host device 130 may issue the HPB READ commands carrying information regarding a starting logical address that the host device 130 attempts to read, a transfer length and the HPB entry to read data. FIG. 6 is a schematic diagram showing operations corresponding to the HPB READ command. The host system may retrieve HPB entry from the HPB cache and send an HPB READ command (e.g. the operation E-1) carrying an LBA (such as the starting LBA), the HPB entry corresponding to this LBA and a TRANSFER LENGTH via an HPB READ command UPIU packet to the UFS device (e.g. the operation E-2). In a specific embodiment, the TRANSFER LENGTH is limited to 1, but the invention should not be limited thereto. In other embodiments of the invention, the TRANSFER LENGTH may be any positive integer. Upon receiving the HPB READ command, the UFS device may decode the received HPB entry corresponding to the designated LBA that the host system attempts to read to obtain information regarding the physical address or the PBA of the designated LBA and access the memory device according to the physical address or the PBA to obtain or fetch the data that the host system attempts to read (e.g. the operation E-3). The UFS device may determine whether the received HPB entry is stall valid in the operation E-3. For example, the UFS device may determine whether the received HPB entry is stall valid by determining whether the content of the T2 table carried in the HPB entry is the same as the corresponding physical address of the latest T1 table maintained by the memory controller 110. When the received HPB entry is determined stall valid, the USF device may obtain the data that the host device 130 attempts to read (e.g. the "logical block data" shown in FIG. 6) and transmit one or more DATA IN UPIU packets to the host system to deliver the data to the host system (e.g. the operation E-4) and transmit a RESPINSE UPIU Command to the host system (e.g. the operation E-5) after the data delivery, where the "logical block data" refers to the data corresponding to the LBA that the host device 130 attempts to read. On the other hand, when the received HPB entry is determined invalid, the UFS device may skip the operation E-4 and directly perform the operation E-5 to recommend for updating the corresponding the HPB entries by transmitting a RESPINSE UPIU Command packet to the host system.

It should be noted that in some embodiments of the invention, the UFS device may actively recommend the host system to update the HPB entry, for example, as in the operation C-2, the UFS device may transmit a RESPONSE UPIU packet to the host system for recommendation for updating Sub-Regions HPB entries, or as in the operation D-2, the UFS device may transmit a RESPONSE UPIU packet to the host system for recommendation for activating the new Sub-Regions. In other embodiments of the invention, the UFS device may also not actively recommend the host system to update the HPB entry. In such embodiments, the UFS device may transmit a RESPONSE UPIU packet to the host system for recommending the host system to update the HPB entry after determining that the corresponding HPB entry is invalid. For example, upon receiving the HPB READ command, the UFS device may recommend the host system to update the HPB entry by transmitting a RESPONSE UPIU packet to the host system when determining that the received HPB entry is invalid in the aforementioned operation E-3.

According to an embodiment of the invention, the memory controller 110 may configure a predetermined memory block as an active memory block (or called a buffer) to receive data from the host device 130, and accordingly record a plurality of logical addresses in a mapping table. The mapping table may be a Physical-to-Logical (P2L) (or called Flash-to-Host (F2H)) mapping table. Different from the global or local L2P mapping table stored in the memory device 120, the P2L mapping table corresponding to the active memory block may be stored in the buffer memory 116 as a temporary mapping table.

In an embodiment of the invention, the P2L mapping table may comprises a plurality of fields, one field of the P2L mapping table corresponds to one physical address of the active memory block and is configured to record mapping information of this physical address, where four physical addresses may correspond to one physical page. For example, one physical address may be used to store 4 Kilobyte (KB) of data, and the size of one physical page may be 16 KB. The mapping information of a physical address recorded in the P2L mapping table of the active memory block is the physical-to-logical mapping information regarding which logical address the data stored in the corresponding physical address of the active memory block is directed to.

In addition, the global or local L2P mapping table (hereinafter collectively called the L2P mapping table) stored in the memory device 120 may comprises a plurality of fields, one field of the L2P mapping table is configured to record mapping information of one logical address, where one logical address may correspond to one logical page. The mapping information of a logical address or a logical page recorded in the L2P mapping table is the logical-to-physical mapping information regarding which physical address of the memory device stores data of the corresponding logical address or logical page.

Generally, content of the P2L mapping table corresponding to the active memory block will be updated to the L2P mapping table stored in the memory device 120 only when the active memory block is full and is to be updated as a data block in the data region within the memory device 120. That is, in the conventional design, the content of the P2L mapping table corresponding to the active memory block will not be updated to the L2P mapping table when the active memory block is still active and is still utilized for receiving data from the host device 130. Therefore, upon receiving a read command with a designated logical address that the host device 130 attempts to read, the memory controller 110 still has to lookup the P2L mapping table corresponding to the active memory block first based on the designated logical address to determine whether the active memory block stores data of the designated logical address. If so, the memory controller 110 provides the data of the designated logical address stored in the active memory block to the host device 130 since the active memory block stores the latest data. If not, the memory controller 110 may have to further load the L2P mapping table (for example, when HPB is not applied) and look up the L2P mapping table to retrieve the physical address that stores data of the designated logical address to be read.

However, as discussed above, table lookup or search in the table is a time consuming operation. In order to solve this problem and to further improve the read speed of the memory device, especially when HPB is applied, in the embodiments of the invention, in response to a determination of recommending for activating one or more sub-regions of the memory device (for example but not limited to, when the HPB is applied under the Device control mode) or delivering one or more HPB entries (for example but not limited to, when the HPB is applied under the Host control mode) is required, the memory controller 110 may be configured to directly update the L2P mapping table based on the P2L mapping table corresponding to the active memory block which records the latest mapping information before delivering the one or more HPB entries to the host device 130. After the L2P mapping table has been updated based on the P2L mapping table corresponding to the active memory block, the memory controller 110 may generate the HPB entries according to the content of the L2P mapping table having the latest mapping information and deliver a packet (such as the DATA IN UPIU packet) comprising the HPB entries to the host device 130.

Figure 7:
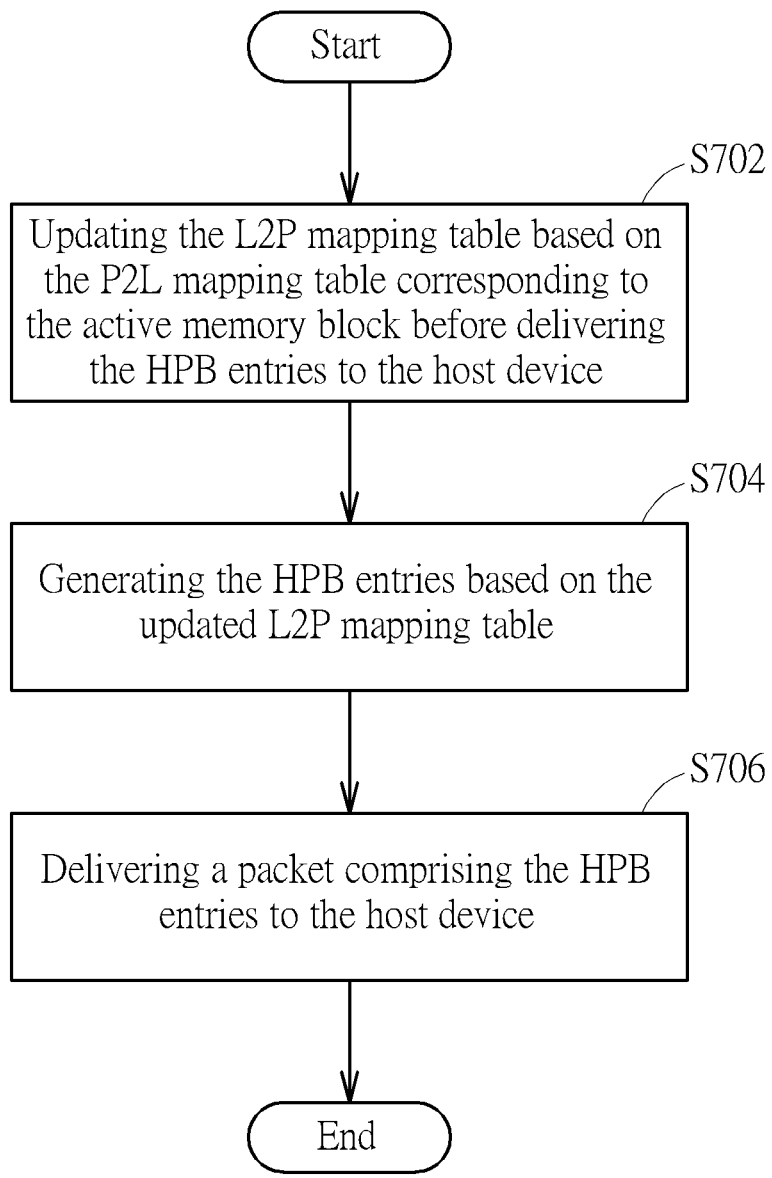
FIG. 7 is a flow chart of a data processing method for improving read speed of a memory device according to an embodiment of the invention.

FIG. 7 is a flow chart of a data processing method for improving read speed of a memory device according to an embodiment of the invention. The method may be performed by the memory controller 110 and may comprise the following steps:

Step S702: updating the content of the L2P mapping table based on the content of the P2L mapping table corresponding to the active memory block before delivering one or more HPB entries to the host device. According to an embodiment of the invention, step S702 may be performed in response to the determination of recommending for activating one or more sub-regions of the memory device (for example, when the HPB is applied under the Device control mode) is required or the determination of delivering one or more HPB entries (for example, when the HPB is applied under the Host control mode) is required.

Step S704: generating the HPB entries based on the updated L2P mapping table.

Step S706: delivering a packet (such as the DATA IN UPIU packet) comprising the HPB entries to the host device.

According to an embodiment of the invention, when updating the L2P mapping table based on the P2L mapping table corresponding to the active memory block, the mapping information recorded in the P2L mapping table is updated to the L2P mapping table regardless of whether the active memory block is full. That is, in the embodiments of the invention, Step S702 may be performed when the active memory block is not full and is still active and utilized for receiving data from the host device 130. Therefore, in the embodiments of the invention, when the memory controller 110 updates the L2P mapping table based on the P2L mapping table corresponding to the active memory block, the status of the active memory block may be full or not full.

In addition, according to an embodiment of the invention, the determination of delivering one or more HPB entries is required may be made in response to reception of an HPB READ BUFFER command. To be more specific, when the HPB is applied under the Host control mode or when the data storage device 100 is configured to support HBP under the Host control mode, upon receiving the HPB READ BUFFER command from the host device 130, the memory controller 110 may determine that delivering one or more HPB entries is required.

According to another embodiment of the invention, when the HPB is applied under the Device control mode or when the data storage device 100 is configured to support HBP under the Device control mode, when the memory controller 110 identifies one or more new Sub-Regions to be activated, the memory controller 110 may determine that recommending for activating one or more new sub-regions of the memory device 120 is required. In an embodiment of the invention, the memory controller 110 may identify one or more new Sub-Regions to be activated after performing garbage collection.

Referring back to the operations under the Host control mode as shown in FIG. 3, in the embodiments of the invention, the Step S702 in FIG. 7 may be incorporated with operation A-3. That is, the memory controller 110 may directly update the content of the L2P mapping table based on the content of the P2L mapping table corresponding to the active memory block, regardless of whether the active memory block now is full or not, before arranging the mapping information recorded in a designated portion of the L2P mapping table into the HPB entries, where the designated portion of the L2P mapping table corresponds to the Sub-Regions to be activated as specified by the host system in the HPB READ BUFFER command. After updating the L2P mapping table, the memory controller 110 may arrange the mapping information recorded in the designated portion of the L2P mapping table into the HPB entries, so as to generate the HPB entries based on the mapping information recorded in the L2P mapping table which having the latest mapping information, and deliver the DATA IN UPIU packet comprising the HPB entries to the host device 130.

Referring to the operations under the Device control mode as shown in FIG. 4, in other embodiments of the invention, the Step S702 in FIG. 7 may be incorporated with operation D-1 or D-5 at the UFS device side, or may be inserted between operations D-1 and D-5. When Step S702 is incorporated with the operation D-1, the memory controller 110 may directly update the content of the L2P mapping table based on the content of the P2L mapping table corresponding to the active memory block in the operation D-1 when identifying new Sub-regions to be activated (thereby determining that recommending for activating the new Sub-regions of the memory device is required). For example, the memory controller 110 may update the L2P mapping table based on the P2L mapping table corresponding to the active memory block before transmitting the RESPONSE UPIU packet to the host system for recommendation for activating new Sub-Regions or inactivating Region. When Step S702 is incorporated with operation D-5, the memory controller 110 may directly update the L2P mapping table based on the P2L mapping table corresponding to the active memory block before arranging the mapping information recorded in a designated portion of the L2P mapping table into the HPB entries, where the designated portion of the L2P mapping table corresponds to the Sub-Regions to be activated as specified by the host system in the HPB READ BUFFER command. After updating the L2P mapping table, the memory controller 110 may arrange the mapping information recorded in the designated portion of the L2P mapping table into the HPB entries, so as to generate the HPB entries based the mapping information recorded in the L2P mapping table having the latest mapping information, and deliver the DATA IN UPIU packet comprising the HPB entries to the host device 130.

In the embodiments of the invention, by directly updating the L2P mapping table based on the P2L mapping table corresponding to the active memory block which may be still active (or, still not full) before providing the HPB entries to the host device 130 when the memory controller 110 knows that providing the HPB entries to the host device 130 may be required, the HPB entries provided to the host device 130 will have the latest mapping information. Since HPB entries provided to the host device 130 are always generated based on the latest mapping information, the operation of looking up the P2L mapping table corresponding to the active memory block according to the designate logical address that the host device 130 attempts to read as in the conventional design can be skipped at the memory controller 110 side, and the read speed can be further improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
   a memory device, comprising a plurality of memory blocks; and
   a memory controller, coupled to the memory device and configured to access the memory device,
   wherein the memory controller is configured to configure a predetermined memory block of the memory device as an active memory block to receive first data from a host device and accordingly record a plurality of logical addresses corresponding to the first data received from the host device in a first mapping table,
   wherein the first mapping table comprises a plurality of fields, wherein one field of the first mapping table is configured to record mapping information of one physical address of the active memory block, and the mapping information of the one physical address is physical-to-logical mapping information that maps a logical address of the first data received from the host device stored in the active memory block to the one physical address used to store the first data received from the host device,
   wherein in response to a determination that either of recommending for activation of one or more sub-regions of the memory device or delivering one or more Host Performance Booster (HPB) entries is required, the memory controller is further configured to directly update a second mapping table based on the first mapping table before delivering the one or more HPB entries to the host device,
   wherein the second mapping table comprises a plurality of fields, wherein one field of the second mapping table is configured to record mapping information of one logical address corresponding to the first data received from the host, and the mapping information of the one logical address is logical-to-physical mapping information regarding which physical address of the memory device stores data of the one logical address, and wherein the memory controller is further configured to generate the one or more HPB entries according to the second mapping table after the second mapping table has been updated based on the first mapping table and deliver a packet comprising the one or more HPB entries to the host device.

2. The data storage device of claim 1, wherein the mapping information recorded in the first mapping table is updated to the second mapping table regardless of whether the active memory block is full when the memory controller updates the second mapping table based on the first mapping table.

3. The data storage device as claimed in claim 1, wherein the memory controller determines that delivering one or more HPB entries is required in response to reception of an HPB READ BUFFER command.

4. The data storage device as claimed in claim 1, wherein the memory controller is configured to update the second mapping table based on the first mapping table before transmitting a response packet to the host device to recommend for activating the one or more sub-regions of the memory device.

5. The data storage device as claimed in claim 4, wherein the response packet is a Response Universal Flash Storage (UFS) Protocol Information Unit (UPIU) packet.

6. The data storage device as claimed in claim 1, wherein the first mapping table is a temporary mapping table stored in a buffer memory of the memory controller and the second mapping table is stored in the memory device.

7. A data processing method for a data storage device, wherein the data storage device comprises a memory device and a memory controller, the memory device comprises a plurality of memory blocks, the memory controller is coupled to the memory device and configured to access the memory device, and the data processing method is performed by the memory controller and comprises:

configuring a predetermined memory block of the memory device as an active memory block to receive first data from a host device and accordingly recording a plurality of logical addresses corresponding to the first data received from the host device in a first mapping table, wherein the first mapping table comprises a plurality of fields, wherein one field of the first mapping table is configured to record mapping information of one physical address of the active memory block, and the mapping information of the one physical address is physical-to-logical mapping information that maps logical address the first data received from the host device stored in the active memory block to the one physical address used to store the first data received from the host device;

in response to a determination that either of recommending for activation of one or more sub-regions of the memory device or delivering one or more Host Performance Booster (HPB) entries is required, directly updating a second mapping table based on the first mapping table before delivering the one or more HPB entries to the host device, wherein the second mapping table comprises a plurality of fields, wherein one field of the second mapping table is configured to record mapping information of one logical address corresponding to the first data received from the host, and the mapping information of the one logical address is logical-to-physical mapping information regarding which physical address of the memory device stores data of the one logical address;

generating the one or more HPB entries according to the second mapping table after the second mapping table has been updated based on the first mapping table; and delivering a packet comprising the one or more HPB entries to the host device.

8. The data processing method as claimed in claim 7, wherein step of updating the second mapping table based on the first mapping table is performed regardless of whether the active memory block is full.

9. The data processing method as claimed in claim 7, wherein the determination of delivering the one or more HPB entries to the host device is required is made in response to reception of an HPB READ BUFFER command.

10. The data processing method as claimed in claim 7, further comprising:

transmitting a response packet to the host device to recommend for activating the one or more sub-regions of the memory device in response to the determination of recommending for activating the one or more sub-regions of the memory device is required, wherein step of updating the second mapping table based on the first mapping table is performed before transmitting the response packet.

11. The data processing method as claimed in claim 10, wherein the response packet is a Response Universal Flash Storage (UFS) Protocol Information Unit (UPIU) packet.

12. The data processing method as claimed in claim 7, wherein the first mapping table is a temporary mapping table stored in a buffer memory of the memory controller and the second mapping table is stored in the memory device.

* * * * *